US005297906A

United States Patent [19]

Durand

[11] Patent Number: 5,297,906
[45] Date of Patent: Mar. 29, 1994

[54] METHOD AND DEVICE FOR PRODUCING A COAXIAL CONNECTOR ELEMENT EQUIPPED WITH AT LEAST ONE STUD

[75] Inventor: Jean-Claude Durand, Voiron, France

[73] Assignee: Radiall, Rosny-sous-Bois, France

[21] Appl. No.: 911,019

[22] Filed: Jul. 9, 1992

[30] Foreign Application Priority Data

Jul. 12, 1991 [FR] France .................. 91 08810

[51] Int. Cl.$^5$ ............................ B23C 3/00; B23C 5/00
[52] U.S. Cl. ........................................ 409/131; 29/557; 407/53; 403/349; 409/165
[58] Field of Search .............. 409/131, 132, 165, 199, 409/226, 228; 82/11, 13; 407/53, 54; 408/203.5; 403/348, 349; 29/557

[56] References Cited

U.S. PATENT DOCUMENTS 2,126,476  8/1938  Koonz .

FOREIGN PATENT DOCUMENTS 49170  10/1889  Fed. Rep. of Germany .

Primary Examiner—Daniel W. Howell
Attorney, Agent, or Firm—Schweitzer Cornman & Gross

[57] ABSTRACT

The invention relates to a method for producing a cylindrical body comprising at least one stud having a cylindrical base portion projecting from its rotating surface in which a cylindrical body blank is produced comprising a peripheral collar of external diameter equal to that of the stud or studs to be obtained, and of width greater than the diameter of the base of the stud or studs to be obtained. Said stud or studs (13) are produced and the excess material from the collar (24) is removed during a single machining operation using at least one machining cutter (14) comprising a hollow shape (15) and rotating about an axis (R3) perpendicular to the longitudinal axis (R1) of the blank (12), by rotatably driving the blank (12) about its longitudinal axis (R1) and by rotatably driving the milling cutter or cutters (14) in the opposite direction about a second axis (R2) parallel to the longitudinal axis (R1) of the blank (12), said milling cutter or cutters (14) having a substantially spherical peripheral cutting surface in contact with the surface of the blank (12).

8 Claims, 3 Drawing Sheets

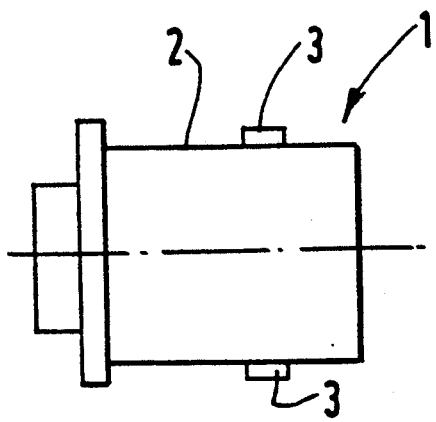
FIG 1
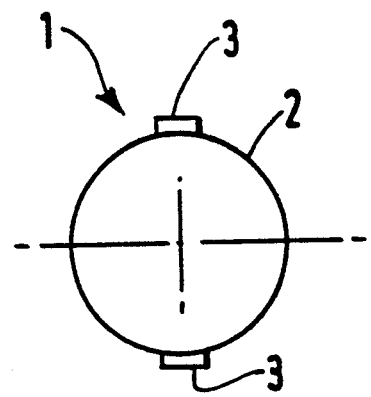
FIG.2
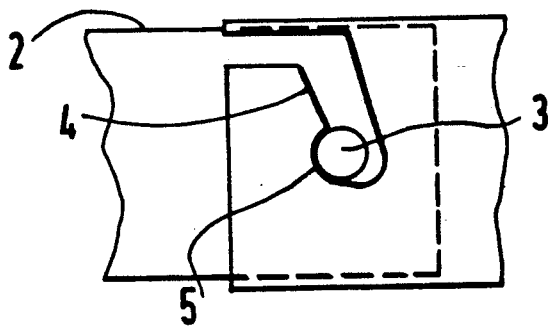
FIG.3
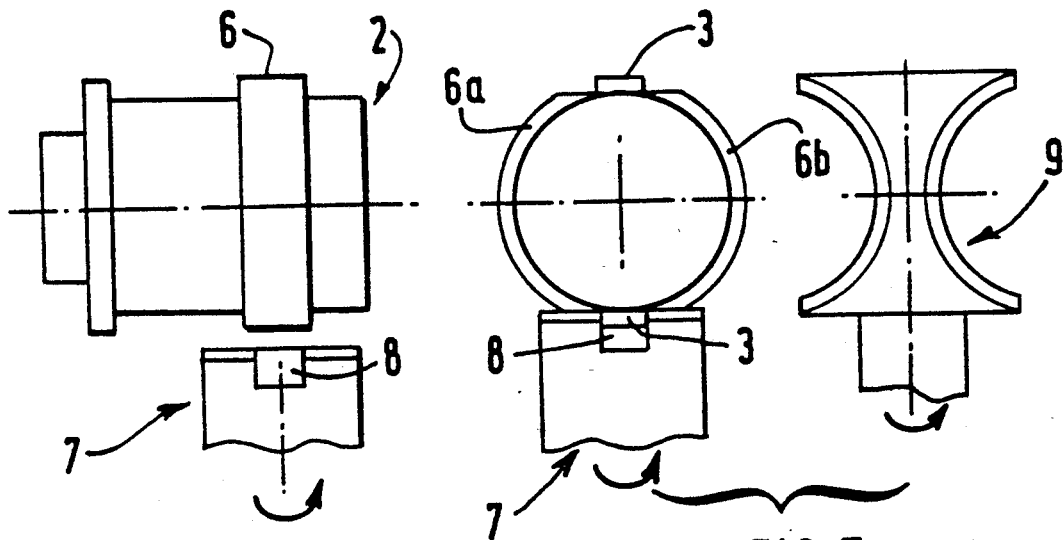
FIG.4
PRIOR ART
FIG.5
PRIOR ART

METHOD AND DEVICE FOR PRODUCING A COAXIAL CONNECTOR ELEMENT EQUIPPED WITH AT LEAST ONE STUD

BACKGROUND OF THE INVENTION

The subject of the invention is a method for producing at least one stud on a cylindrical body, a device for implementing this method, and a coaxial bayonet locking connector equipped with at least one stud obtained by said method.

Bayonet systems are known for locking two cylindrical bodies, of which one comprises on its surface a projecting stud and usually two diametrically opposed studs, and the other is equipped with ramps and locking notches in order to receive the stud or studs. These bayonet locking systems are used in particular in coaxial connectors commonly known by the term BNC. In known locking systems, the studs are of cylindrical shape and have an axis perpendicular to that of the cylindrical body on which the studs are produced.

In known methods for producing a cylindrical body comprising cylindrical studs projecting from its external surface, a cylindrical body blank is produced comprising a peripheral collar of external diameter equal to that of the studs to be obtained, and of width greater than the diameter of the base of the studs to be obtained, the studs are produced by milling and the excess material from the collar is removed thereby leaving the studs.

The drawback of the known methods is that their implementation requires several machining operations using various tools, between which the blank to be machined must be taken up.

In particular the methods of the prior art do not allow the stud or studs to be machined during the rotation of the blank in the machining lathe on which it is produced, for example during the boring (drilling) operations on the part.

SUMMARY OF THE PRESENT INVENTION

The invention overcomes the aforementioned drawbacks by proposing a method for producing at least one stud on a cylindrical body, allowing the machining of the stud or studs during a rotation of the cylindrical body blank especially on the machining lathe, which makes it possible to reduce the total machining time and thus ensure a more cost-effective manufacture.

The method according to the invention involves the stud or studs producing and removing the excess material from the collar during a single machining operation using at least one milling cutter comprising a hollow shape and rotating about an axis perpendicular to the longitudinal axis of the blank, by rotatably driving the milling cutter or cutters in the opposite direction about a second axis parallel to the longitudinal axis of the blank, said milling cutter or cutters having a substantially spherical peripheral cutting surface in contact with the surface of the blank, the tangential rotational speed to said peripheral surface about said second axis being equal to the tangential rotational speed of the external surface of the blank about its longitudinal axis.

In the method according to the invention, two diametrically opposed studs are advantageously machined on said cylindrical body during the same machining operation preferably using two milling cutters having substantially spherical cutting surfaces which milling cutters are mounted in diametrically opposed positions on a support rotating about said second axis of rotation.

A device for implementing the method according to the invention, comprises at least one milling cutter having a substantially spherical cutting surface pierced by a cavity, mounted rotatably on a support rotating about an axis perpendicular to the axis of rotation of the milling cutter or cutters and parallel to the axis of rotation of the blank, and means for synchronizing the tangential rotational speed of the milling cutter or cutters about the second axis with the tangential speed of the cylindrical body blank.

In a preferred device according to the invention, the envelope diameter of the milling cutter or cutters is a multiple of the diameter of the cylindrical body blank.

The cylindrical bodies obtained by the method according to the invention comprise at least one stud having a cylindrical base portion, projecting from their peripheral surface.

In a cylindrical body according to the invention, the stud is symmetrical, over the major part of its height, with respect to two perpendicular planes and the cross section of the stud in a first plane of symmetry comprises two straight segments and the cross section of the stud in the second plane of symmetry comprises two development segments.

The invention will be better understood with reference to the appended drawing given by way of an example which is by no means limiting, in which:

DESCRIPTION OF THE DRAWINGS

FIG. 1 is a diagrammatic side elevation of a coaxial connector body of the known technology, FIG. 2 is a diagrammatic front elevation of the end of a coaxial connector body according to FIG. 1, FIG. 3 is a diagrammatic side elevation of a bayonet locking system of known type, FIGS. 4 and 5 illustrate a method of producing studs according to the known technology.

DETAILED DESCRIPTION OF THE INVENTION

Figure 6:
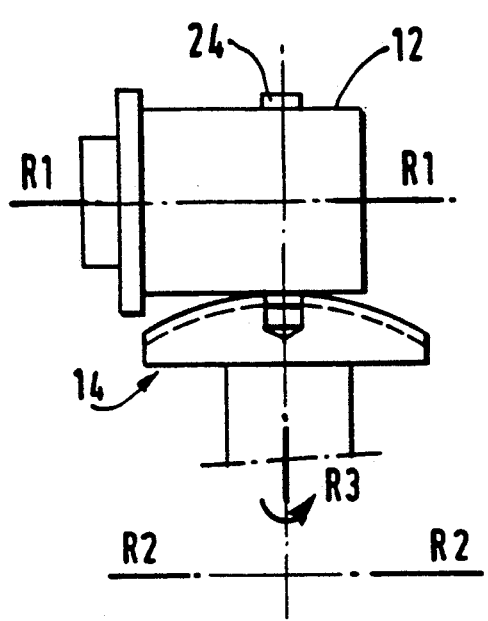
FIGS. 6 and 7 illustrate a method for producing a stud according to the invention.

With reference to FIGS. 1 and 2, a male coaxial connector element 1 or plug with bayonet locking produced according to the known technology comprises a cylindrical body 2 and two diametrically opposed studs 3 of substantially cylindrical shape and having an axis perpendicular to that of the cylindrical body 2. According to FIG. 3, a stud 3 able to-slide along a ramp 4 is applied against a locking notch 5 of substantially circular shape.

The ramp 4 and the notch 5 are produced in the wall of a complementary female connector element.

According to FIGS. 4 and 5, a method for producing the stud by the known technology comprises the prior machining of a collar 6 on a cylindrical body blank 2, then rotatably immobilizing or dismantling the blank to be machined. By means of a hollow milling cutter 7 pierced with a hollow cavity 8 corresponding to the diameter of the stud to be machined, the immobilized collar 6 is machined, as represented on the left-hand side of FIG. 5, in order thus to leave two diametrically opposed studs 3. The remaining parts 6a and 6b of the collar 6 are then removed by means of a shaped milling cutter 9 or by any equivalent means such as broaching or milling using other shapes of milling cutters.

Thus it has been observed that, according to the known technology, it is necessary to immobilize or dismantle the blank in order to produce the studs 3 on the cylindrical body blank 2.

By contrast, the method according to the invention makes it possible, to produce one or several studs on a rotating cylindrical body blank, especially on its machining lathe, without stopping the rotation of the blank.

Thus, while the studs are being machined on the outside, it is possible, for example, to machine the inside of the body. This combination of machining operations thus allows the total machining time to be reduced, and the cost price of the machined pieces to be significantly decreased.

Figure 7:
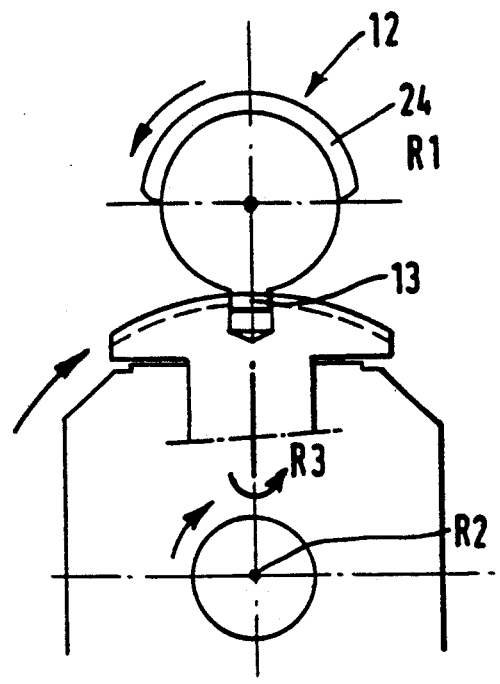

According to FIGS. 6 and 7, the cylindrical body blank 12 is rotatably driven about the axis R1 by a drive motor, not shown, which can advantageously be the machining lathe of the blank.

The axis of rotation R1 is substantially coincident with the longitudinal axis of the blank 12. A milling cutter 14 having a substantially spherical peripheral cutting surface rotating about an axis R3 is used.

According to the invention, the milling cutter 14 is rotatably driven about a second axis R2 substantially parallel to the axis of rotation R1 of the blank 12.

In order to avoid the milling cutter snatching at the material, a tangential speed about the axis R2 equal to the tangential speed about the axis R1 is adopted at the point of contact, the milling cutter 14 and the blank 12 rotating in opposite directions.

The external diameter of the milling cutter 14 is intended to machine the collar 24 over at least a half turn of the blank.

In this case it is sufficient that the milling cutter 14 passes in front of the blank in a position which is diametrically opposed to the first stud in order to machine a second stud which is diametrically opposite the first and to remove the excess material from the collar 24 during a single machining operation.

Figure 8:
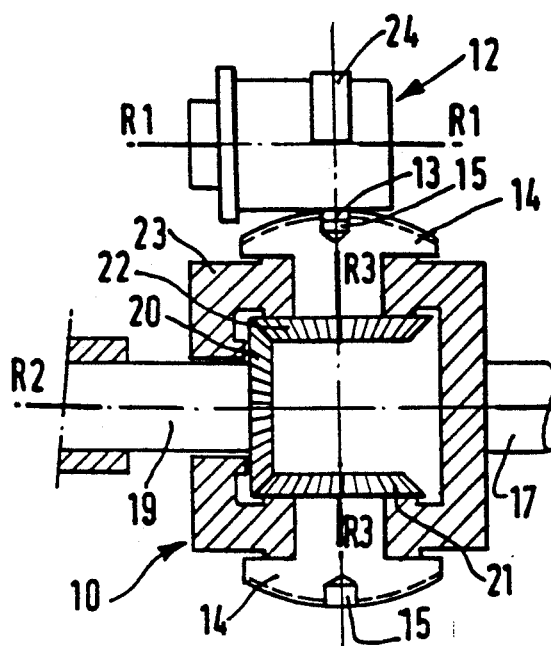
FIGS. 8 and 9 illustrate a method for producing two studs according to the invention.
Figure 9:
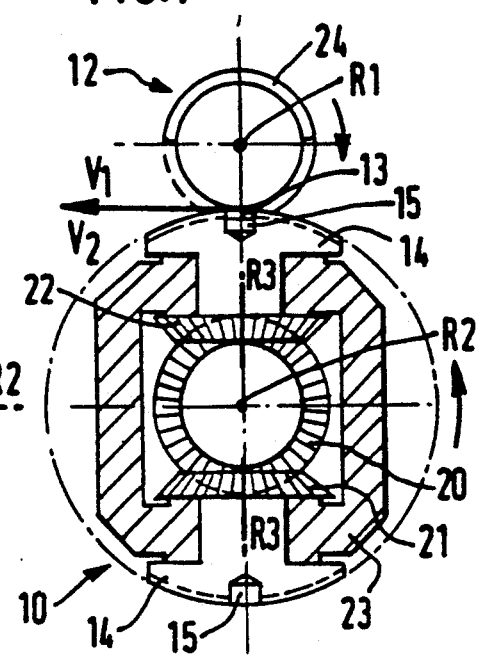

According to FIGS. 8 and 9, a machining device 10 comprising two diametrically opposed milling cutters 14 equipped with a cavity 15 is used. The cavity 15 surrounds the axis of rotation of the milling cutter 14, and its shape is substantially cylindrical. The external profile of the milling cutter 14 has a substantially spherical cutting surface. Means for synchronizing the rotational speed of the device 10 about the axis of rotation 17 make it possible to establish a synchronous relationship between the rotational speed of the cylindrical body blank 12 about its axis and the rotational speed of the device 10 driven by the shaft 17 about the axis R2, consequently the cylindrical body blank 12 and the device 10 rotate in opposite directions and the linear speed V2 tangential to the device 10 at the end of the cutting surface of a milling cutter 14 is substantially equal to the linear speed V1 tangential to the external surface of the cylindrical body 12.

The rotation of the milling cutters 14 may be obtained independently via a drive shaft 19 of a set of gears 20, 21, 22 mounted in a casing 23. The synchronized relationship between the rotational speed of the device 10 about the rotation shaft 17 and the rotational speed of the cylindrical body blank 12 is obtained in such a way as to be able to machine the desired number of studs in the collar 24, the width of which is greater than that of the studs to be produced.

According to the invention, a preferred embodiment of the device 10 comprises a combination of two milling cutters 14 whose envelope diameter is a multiple of the diameter of the workpiece to be machined, preferably an odd multiple in order to machine an even number of studs. When the envelope diameter of the milling cutters 14, shown in dot and dash lines in FIG. 9, is an odd multiple of the diameter of the cylindrical body blank 12, the workpiece to be machined performs an odd multiple of the number of revolutions carried out by the device 10. By way of example, FIGS. 8 and 9 represent a device where the envelope diameter of the milling cutters 14 is equal to three times the diameter of the cylindrical body blank 12. This arrangement makes it possible to machine two diametrically opposed studs 13 by using a mounting in which the spindle 19 and the gear 20 are fixed with respect to the machine such as an automatic lathe rotatably driving the cylindrical body blank 12. In this case, the rotational speed of the milling cutters 14 is a function of the rotational speed and also of the linear speed V2 of the device 10, driven by the shaft 17.

Figures 10, 11:
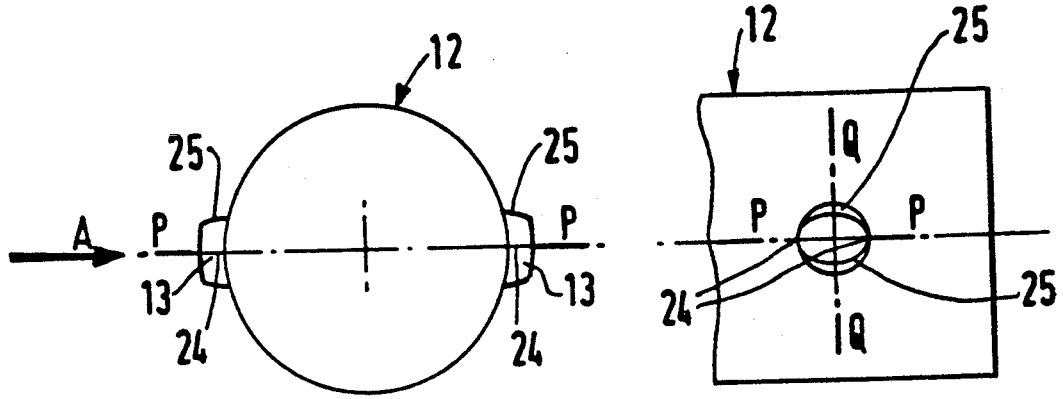
FIGS. 10 and 12 are diagrammatic views similar to FIGS. 2 and 3 of a connector peg produced according to the invention and of the associated locking system.
FIG. 11 is a diagrammatic view in the direction of the arrow A of FIG. 10.

According to FIGS. 10 and 11, it can be seen that the studs obtained 13 are symmetrical with respect to two orthogonal planes P and Q. The plane of symmetry P contains the axis of revolution of the cylindrical body blank 12, and the cross section of the studs 13 via the plane P contains two straight segments which are substantially perpendicular to the cylindrical body 12. The straight sections 24 would be obtained in an identical fashion as rectilinear generatrices of a cylinder 3 according to FIGS. 1 and 2 by means of the machining method according to FIGS. 4 and 5.

The cross section through a plane of symmetry Q of the stud 13 perpendicular to the axis of revolution of the cylindrical body blank 12 comprises two development segments 25, which are development segments corresponding to the shape generated by the cavity 15 of a milling cutter 14 during the synchronized machining according to FIGS. 6 and 7. In the case where the cavity 15 is of substantially cylindrical shape, the segments 25 are substantially in the shape of the development of a circle.

Figure 12:
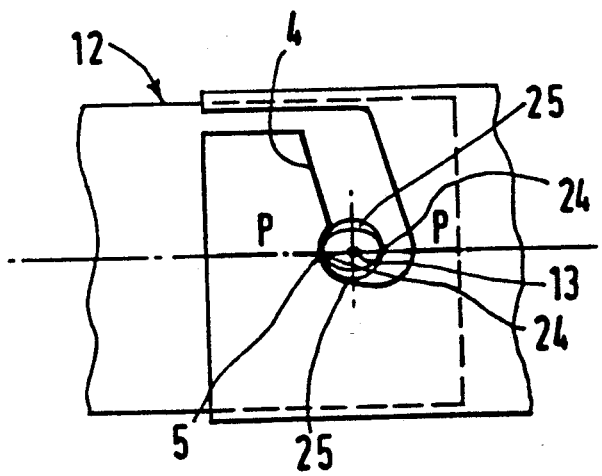

The locking system represented in FIG. 12 diagrammatically represents a male connector element according to the invention assembled with a female connector element of known type. It can be seen that locking is carried out by the substantially cylindrically curved part in the region of the segment 24 bearing in the locking notch 5 of the female part. The straight segment 24 advantageously bears substantially rectilinearly in the bottom of the notch 5. Surprisingly, it has been observed that the studs of the male elements according to the invention have identical performance and identical reliability to those of the cylindrical studs of known type.

Although the invention has been described in connection with a particular embodiment, various variations and modifications can of course be applied without departing either from the scope or from the spirit of the invention.

I claim:

1. A method for producing a cylindrical body comprising at least one stud having a cylindrical base portion projecting from its rotating surface in which a cylindrical body blank is produced comprising a peripheral collar of external diameter equal to that of the stud or studs to be obtained, and of width greater than the diameter of the base of the stud or studs to be obtained, the stud or studs are produced by milling and the excess material from the collar is removed thereby leaving the stud or studs, wherein the stud or studs (13) are produced and the excess material of the collar (24) is removed during a single machining operation using at least one milling cutter (14) comprising a hollow shape (15) and rotating about an axis (R3) perpendicular to the longitudinal axis (R1) of the blank (12), by rotatably driving the blank (12) about its longitudinal axis (R1) and by rotatably driving the milling cutter or cutters (14) in the opposite direction about a second axis (R2) parallel to the longitudinal axis (R1) of the blank (12), said milling cutter or cutters (14) having a substantially spherical peripheral cutting surface in contact with the surface of the blank (12), the rotational speed (V2) tangential to said peripheral surface about said second axis (R2) being equal to the rotational speed (V1) tangential to the external surface of the blank (12) about its longitudinal axis (R1).

2. The method as claimed in claim 1, wherein two diametrically opposed studs (13) are machined on said cylindrical body blank (12) during the same machining operation.

3. The method as claimed in claim 2, wherein said studs (13) are machined using two milling cutters (14) having a substantially spherical cutting surface which milling cutters are mounted in diametrically opposed positions on a support (10) rotating about said second axis (R2) of rotation.

4. A device for implementing the method as claimed in claim 1, wherein it comprises at least one milling cutter (14) having a substantially spherical cutting surface pierced by a cavity (15), mounted rotatably on a support (10) rotating about a second axis (R2) perpendicular to the axis of rotation (R3) of the milling cutter or cutters and parallel to the axis of rotation (R1) of the blank (12) and means (17) for synchronizing the rotational speed (V2) about the second axis (R2) with the tangential speed (V1) of the cylindrical body (12).

5. The device as claimed in claim 3, wherein the envelope diameter of the milling cutter or cutters (14) is a multiple of the diameter of the cylindrical body blank (12).

6. A cylindrical body comprising at least one stud having a cylindrical base portion and obtained by implementing the method as claimed in claim 1, wherein, over the major part of its height, the stud (13) is symmetrical with respect to two perpendicular planes (P, Q) and the cross section of the stud (13) in a first plane (P) of symmetry comprises two straight segments (24) and the cross section of the stud in the second plane (Q) of symmetry comprises two development segments (25).

7. The cylindrical body as claimed in claim 6 wherein the stud (13) has, in the region of said straight segments (24), a substantially circular cylindrical surface.

8. A coaxial connector element, wherein it comprises a cylindrical body as claimed in claim 6.

* * * * *